US008648209B1

(12) United States Patent
Lastella

(10) Patent No.: US 8,648,209 B1
(45) Date of Patent: Feb. 11, 2014

(54) LOOP REACTOR FOR MAKING BIODIESEL FUEL

(76) Inventor: Joseph P. Lastella, Bakersfield, CA (US)

( * ) Notice: Subject to any disclaimer, the term of this patent is extended or adjusted under 35 U.S.C. 154(b) by 525 days.

(21) Appl. No.: 11/647,513

(22) Filed: Dec. 28, 2006

Related U.S. Application Data

(60) Provisional application No. 60/755,638, filed on Dec. 31, 2005.

(51) Int. Cl.
*C11C 3/10* (2006.01)
*B01J 19/00* (2006.01)

(52) U.S. Cl.
USPC ........... 554/169; 422/117; 422/129; 422/224; 422/225; 422/234

(58) Field of Classification Search
USPC .......... 554/169; 422/117, 129, 224, 225, 234; 44/308, 369
See application file for complete search history.

(56) References Cited

U.S. PATENT DOCUMENTS 2,383,579 A * 8/1945 Allen et al. .................... 554/167
2,452,724 A * 11/1948 Bradshaw .................. 252/367.1
3,035,033 A * 5/1962 Schweitzer, Jr. et al. ....... 526/79
3,313,834 A * 4/1967 Allen et al. .................. 554/168
3,861,652 A * 1/1975 Clark et al. .................. 366/336
4,372,918 A * 2/1983 Woods et al. ................ 422/129
4,935,348 A * 6/1990 Gerard oosterhuis et al. .. 435/41
6,015,440 A * 1/2000 Noureddini ..................... 44/388

FOREIGN PATENT DOCUMENTS

DE 10210432 A1 * 9/2003

OTHER PUBLICATIONS

Coil. (2009). In Merriam-Webster Online Dictionary. Retrieved Oct. 30, 2009, from http://www.merriam-webster.com/dictionary/coil.*

* cited by examiner

*Primary Examiner* — Jennifer A Leung
(74) *Attorney, Agent, or Firm* — David L. Hoffman; Hoffman Patent Group

(57) ABSTRACT

A biodiesel plant includes a loop-shaped reactor which circulates reactants, e.g., feed stock and a methanol catalyst mixture through mesh to mix the reactants and form crude biodiesel. The feed stock is preferably heated to about 200 to 210° F. After the reaction, methanol may be recovered. There may also be a tank for removal of glycerin from the crude biodiesel. In another embodiment, there is a method for reacting the feed stock and methanol catalyst mixture by circulating the reactants through a turbulence-creating path, such as by using mesh in the reactor.

18 Claims, 14 Drawing Sheets

LOOP REACTOR FOR MAKING BIODIESEL FUEL

CROSS REFERENCE TO RELATED APPLICATION(S)

This application claims priority from U.S. Provisional Patent Application Ser. No. 60/755,638 filed Dec. 31, 2005, and which is incorporated by reference herein.

BACKGROUND OF THE INVENTION

1. Field of the Invention

The present invention relates to a plant for making biodiesel fuel, and a method of making the fuel.

2. Description of the Related Art

In a process of making biodiesel fuel from soy bean oil, tallow (yellow grease) or other raw material containing fatty acid esters, generally the raw material is processed with methanol and potassium hydroxide or sodium hydroxide.

In U.S. patent application Ser. No. 10/235,065, filed Sep. 4, 2002, in the name of the present inventor (referred to herein as "Continuous Flow Application"), and incorporated by reference herein, there is disclosed a continuous flow process for forming biodiesel from food oils such as yellow grease, vegetable oil, soy bean oil, or other raw material having fatty acid esters. The Continuous Flow Application also contains a description of the conventional batch process.

In either the continuous or batch process for making biodiesel, the raw material, the yellow grease, vegetable oil, soy bean oil, or other raw material having fatty acid esters, often comes from or includes waste oil from cooking. This waste oil is processed with methanol and preferably with a catalyst such as sulfuric acid ($H_2S$) in a first reaction vessel, such as shown in the Continuous Flow Application.

The methanol reacts with the fatty acid in the oil and produces a methyl ester material. Then, the methyl ester material (treated raw material) is sent to a first settling tank where the sulfuric acid ($H_2S$) and a small amount of methanol separate and may be drained and reused. The treated separated raw material is then reheated in a batch process, or kept heated in a continuous process, and mixed in a second reaction vessel with more methanol, and also with a catalyst, such as potassium hydroxide (KOH) or sodium hydroxide (NaOH). A reaction known as esterification takes place, creating a mixture of raw or crude biodiesel fuel, and excess methanol, and perhaps some catalyst. This mixture is sent to a second settling tank. In this second settling tank, the crude biodiesel fuel rises to the top, while the methanol, glycerol and some fatty acid soap sink to the bottom.

To minimize the amount of soap, an excess amount of methanol is typically used. That is, more methanol is used than is necessary to react with the amount of raw material. It is desirable to recover the excess methanol. Moreover, it is desirable to remove any entrained methanol and any other unreacted substances from the crude biodiesel.

In the above conventional batch process and the continuous flow application process and plant, there is no pressure applied to the fluids as they flow through the plant. Also, the fluids are reacted in vessels. There are four vessels in the process, because there are two reactions and two subsequent settling processes required. The temperature of the fluid must be kept below the boiling point of methanol to avoid the escape of methanol vapors which are hazardous. Moreover, there is no pressure applied to the fluid other than in the continuous flow application the fluid is continuously pumped through the plant. The present inventor has recognized that because of the conventional limitations of operating sufficiently below the boiling point of about 149° F. of methanol, and operating without added pressure (because of the reaction vessels), the reaction can only take place so fast.

SUMMARY OF THE INVENTION

A biodiesel plant includes a loop-shaped reactor which circulates reactants, e.g., feed stock and a methanol catalyst mixture through mesh to mix the reactants and form crude biodiesel. The feed stock is preferably heated to about 200 to 210° F. After the reaction, methanol may be recovered. There may also be a tank for removal of glycerin from the crude biodiesel. In another embodiment, there is a method for reacting the feed stock and methanol catalyst mixture by circulating the reactants through a turbulence-creating path, such as by using mesh in the reactor.

DESCRIPTION OF THE PREFERRED EMBODIMENT(S)

Figure 1:
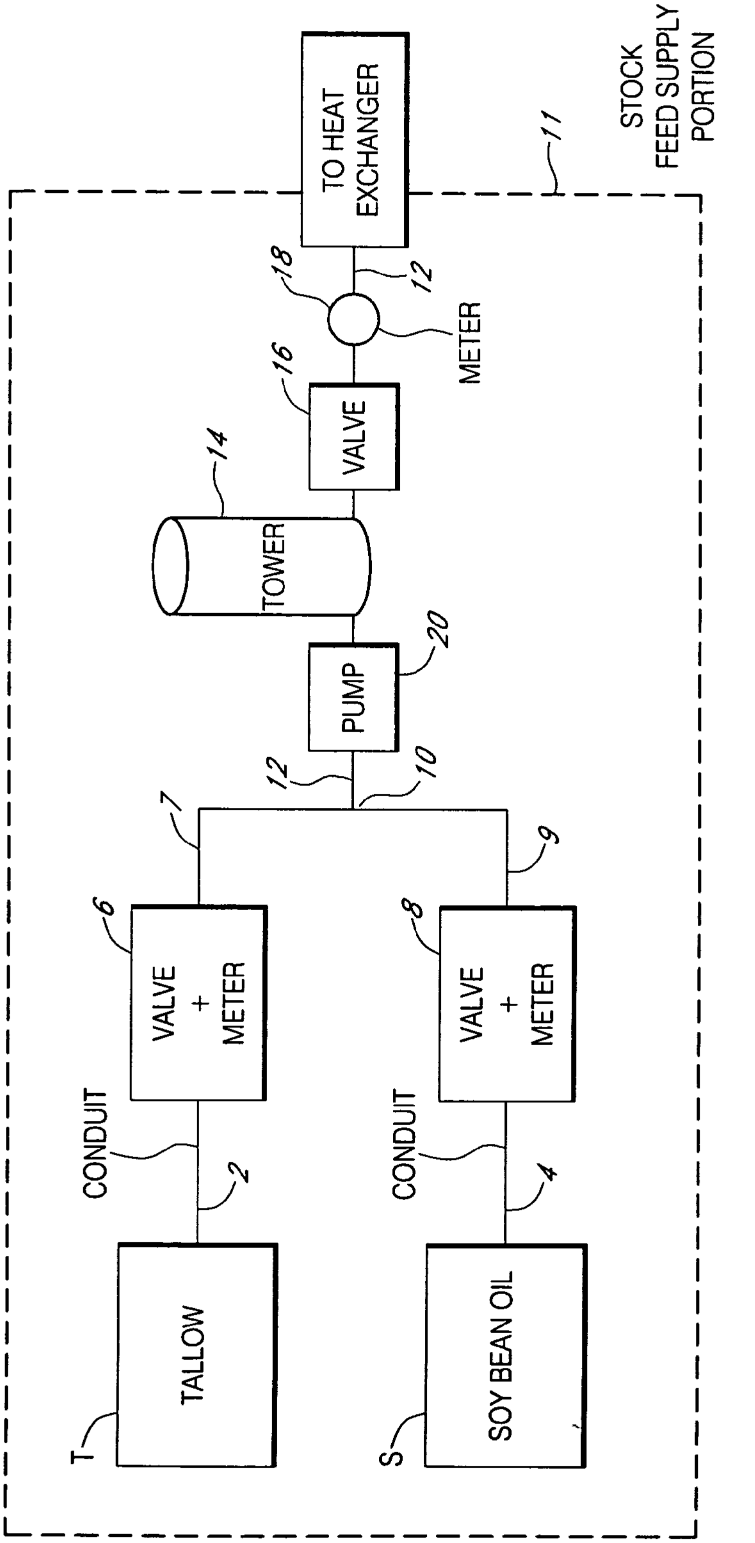
FIG. 1 is a schematic view of a feed stock supplying portion of a plant in accordance with a preferred embodiment of the invention.

As shown in FIG. 1, raw ingredients such as tallow and/or soy bean oil are in storage tanks T and S, respectively. They then pass through conduits 2, 4 and through valves (and meters) 6, 8, respectively. The valves may be mechanical or electromechanical, e.g., of a solenoid type. Preferably, the valves can be set to variable amounts. Meters are also preferably associated with the valves to measure the flow out. By setting equal out flow rates, a blend of fifty percent tallow and fifty percent soy bean oil may be achieved. Other blends, e.g., sixty percent tallow and forty percent soy bean oil, or vice versa, or twenty percent tallow and eighty percent soy bean oil may be achieved. Another desirable blend is seventy percent tallow and thirty percent soy bean oil, or visa versa. Because it is easier to obtain a higher grade of biodiesel from soy bean oil then from tallow (although tallow is currently less expensive), the blend amount may be set depending on the grade of biodiesel desired. In addition, the blend amount may be set to achieve tax benefits, when such benefits require a predetermined amount of one or more of the raw ingredients.

The raw ingredients continue through conduits 7, 9, respectively, and through a T-connector 10 (or Y-connector) where they are blended. They then pass through another conduit 12 through a pump 20, and into a tower 14, through a valve 16, and a meter 18.

The pump is preferably a positive displacement pump or gear pump. The pump motor may be e.g., a 1 HP or 1½ HP motor. It can be electric, air, or other motor. It can be variable by means of a clutch or variable speed. The RPMs of the motor determine the flow rate of the mixed raw fluid. The RPMs of the motor are directly related to the flow rate e.g. in gallons per hour (gph). For example, in one embodiment, 450 RPMs of the motor for the pump results in 450 gph, and in another embodiment, 600 RPMs results in 600 gph.

The pump 20, in this preferred embodiment, is a piston style pump or gear pump. To even out the flow rate, the pump output goes up into a tower 14. The tower allows the flow rate to remain constant even though the pump output is not constant such as in the case of a piston pump. The flow then passes through a pressure valve 16 which is set at the desired operating pressure for the plant, with the aid of the meter 18. When the flow out from out of the piston pump is higher than the operating pressure of pressure valve 16, the fluid backs up into the tower, rather than putting back pressure on the pump. When the flow from the pump is lower than the pressure set by the pressure valve 16, the pressure from the mixture being in the tower is sufficient to maintain the flow rate. A piston pump creates high pressure on the up stroke or forward stroke, and low pressure (none) on the down stroke or back stroke. Since the liquid is incompressible, any shock from increased pressure is taken out of the system by the air in the tower where the liquid will move up into the column in response to excess pressure and down in response to low or no pressure, and thus acts like a shock absorber for the system and maintains a relatively constant pressure. The pressure and thus the flow rate through the plant stays the same, even if the pressure on the flow is increased.

Figure 2:
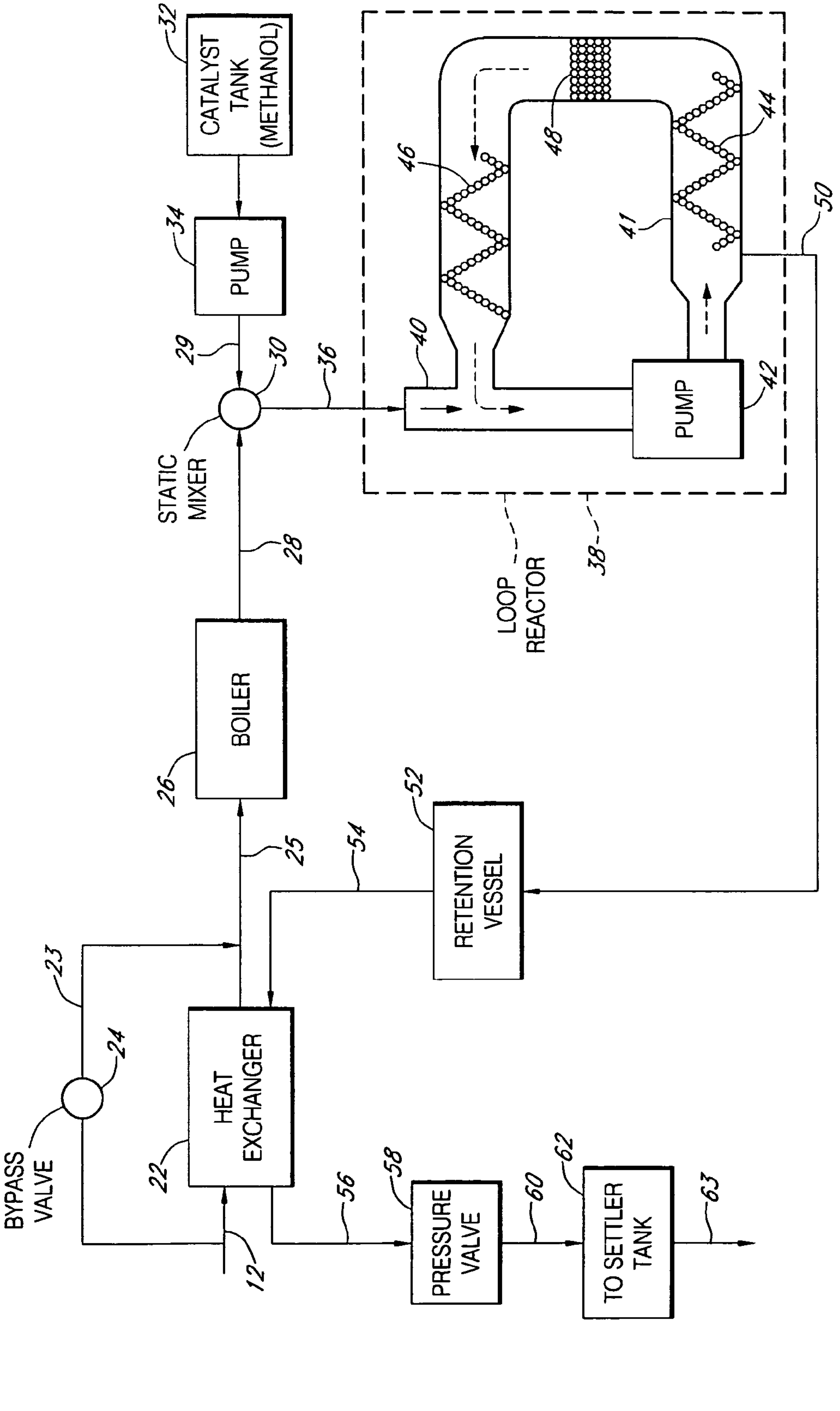
FIG. 2 is a schematic view of a portion of the plant of FIG. 1 for forming biodiesel from feed stock using a loop reactor in accordance with the preferred embodiment of the invention.

After exiting the meter 18, the flow preferably passes through conduit 12 to a heat exchanger 22, as shown in FIG. 2. It is preferred that the raw ingredients, e.g., the soy bean oil and the tallow, be stored at room or ambient temperature. This way, the entire storage tank need not be heated. However, the present inventor has found that the reactions that form the biodiesel, (the reactions e.g., as described in the same inventor's continuous flow application U.S. patent application Ser. No. 10/235,065, filed Sep. 4, 2002 incorporated by reference herein), will take place extremely fast when the raw ingredients are heated close to or at 180° F. While the tallow and soy bean oil could be heated in their storage tanks or any where along the line prior to entering the reactor, it is preferable to have the heating take place as close to the reactor as possible, to minimize heat loss, minimize hot components, and minimize the need for insulation.

As an example, the heat exchanger may raise the temperature of the inputted raw materials from ambient, e.g., about 70° F., to e.g., about 120° F., e.g., by extracting heat from the returning processed crude biodiesel from a retention vessel (as described below) or an optional second loop reactor (also as described below). If the outputted fluid from the heat exchanger 22 is hotter than desired, a bypass loop 23 having a valve 24 such as a solenoid valve may be used to bypass a sufficient amount of fluid to keep the output at the desired temperature. The fluid then passes along a conduit 25 to a boiler 26, where the fluid is heated, e.g., to about 220° F.

The heated raw fluid passes through a conduit 28 to a static mixer 30, e.g., a mixing valve or just a T (or Y) shaped conduit, where the fluid is mixed with catalyst, e.g., methanol, from a storage tank 32 to the mixer 30 via a pump 34. In a preferred embodiment, pump 34 operates at 105 gph (1.75 gpm). If the output of the boiler is approximately 220° F., the output from mixer 30 to conduit 36 may be about 190° F., since the methanol preferably kept at ambient temperature. Preferably, the boiler is kept at or under 240° F. and 40 psi, e.g., akin to a residential boiler. The pressure is increased above one atmosphere by pump 20 (FIG. 1) to system operating pressure, preferably 40 to 70 psi. This is above one atmosphere (about 15 psi) of pressure.

The reactor 38 according to a preferred embodiment of the invention is in the form of a loop of conduit 40, 41 and a pump 42, such as a centrifugal pump, set at a relatively high speed compared to the flow rate from the pump 20 of FIG. 1. For example, pump 42 may be set at 100 gallons per minute (many times a flow rate of e.g., 4.5 gallons per minute from the pump 20). Mesh, such as wire mesh, even mesh such as a chain link fence type of mesh, is preferably provided in the reactor 38. Mesh 44 and 46 are shown in a bent continuous M or W pattern. Mesh such as at element 48 may be provided in a tighter orientation, i.e., folded in an M or W and then pressed together with much less spacing between folds. Greater spacing between folds may also be used, depending on required mixing times, pumping speeds and pressures, and other factors. The mesh is preferably throughout the conduit 41. Mesh may also be used in conduit 40 downstream of where conduit 41 joins conduit 40.

The increased flow rate in the reactor, especially when mesh is contained in the conduits thereof, results in excellent mixing of the raw fluid and catalyst. Preferably, the mesh has a diamond shape defining each hole which provides eddy currents then mix and re-mix. Other shapes of mesh will work as well. In a preferred embodiment, the reactor has about an eleven gallon capacity, therefore, for a 100 gpm pump, the circulation is about 9.1 time's per minute. One cycle thus takes about six to seven seconds.

The outflow from the reactor taken e.g., along conduit 50 goes to a retention vessel 52 described in more detail below. The outflow is about the same temperature as the inflow, e.g., 190° F. if 190° F. coming in. In addition, the outflow rate is the same or approximately the same as the flow rate into the reactor, e.g., 4.5 gpm.

After retention vessel 52, the fluid passes through a conduit 54, back through the heat exchanger 22 to have its heat taken out and used by the input fluid on conduit 12. (A second heat exchanger could be used, but this is a very efficient embodiment.) For example, the 190° F. output from the reactor 38 may be cooled to 140° F. after passing through the heat exchanger 22. The cooled fluid then passes through a conduit 56, a pressure valve 58 and a conduit 60 into a settler tank 62, as in the above mentioned continuous flow application.

Although in the continuous flow application, potassium hydroxide (KOH) is also used as a catalyst, in the presently preferred embodiment it is not used, although it could be used. For example, the methanol can be pre-mixed with some KOH or some potassium methylate or sodium methylate.

Preferably, the piping is all stainless steel, and no rubber is used. Biodiesel fuel wears rubber quickly. The stainless steel piping enables pressures of up to 200 to 300 psi, and temperatures of up to 300° F.

The reactor pump speed, length of loop, temperature of the feed stock, pressure, and other factors can be varied to achieve desired results. Many other variations of these constraints will be evident to those of ordinary skill in the art.

The high heating of the input fluid, e.g., to 180 or 190° F. upon entry into the reactor results in a complete reaction of raw feed material with catalyst into raw biodiesel in about nine Minutes or less in a plant of the preferred embodiment. Even at 156° F. the reaction takes place in about 18 minutes. Yet, at 140 to 145° F. the reaction takes approximately one to one and a half hours.

The high heat and superior mixing of the preferred embodiment enables greater use of tallow and other difficult feed stocks. Thus, the preferred embodiment enables blends such as noted above, or other blends.

Figure 3:
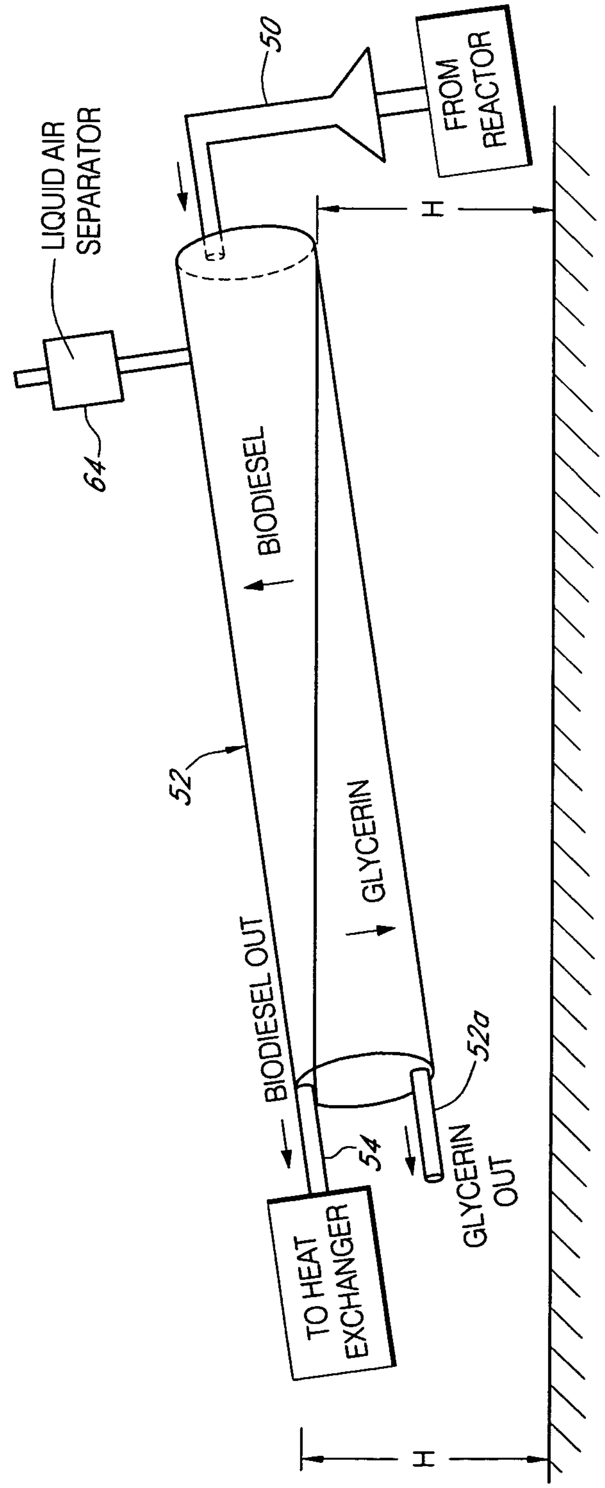
FIG. 3 is a schematic view of a settler tank portion of the plant of FIG. 1.

Details of retention vessel 52 are shown in FIG. 3. The mixture of raw materials and catalyst is preferably at about 190° F. and 40 psi, but many other temperatures and pressures will do. The pressure valve 58 is thus preferably set at 40 psi, the desired pressure in the retention vessel.

Retention vessel 52 separates glycerin and biodiesel, and allows the homogeneous mixture obtained from the loop reactor to continue reacting under high pressure and temperature. That is, once the loop reactor has created a homogeneous mixture of catalyst and feed stock, the remainder of the reaction will continue without the need for further agitation, resulting in minimizing the need for mixers and reducing plant size. The retention vessel is performing two functions, continuing the reaction at high pressure and temperature into biodiesel and separating resultant glycerin and raw biodiesel in one vessel, both faster than the industry does in many separate vessels and/or treatments. The continuation of the reaction and the separation function require no moving parts in the inventive retention vessel.

Glycerin is heavier than biodiesel, so glycerin falls to the bottom and biodiesel moves to the top. The retention vessel/separator of the invention is made so that there is substantial surface area of the interface between the biodiesel and the glycerin, so that the glycerin only has to fall a short way, e.g., inches, to separate from the biodiesel. This makes for a fast separation. For example, in a 39 gallon capacity pipe e.g., fifteen feet long, and a 5.75 flow rate per minute, the retention time in the vessel is about 6.8 minutes (39 divided by 5.75) at 40 psi and 190° F.

The loop reactor provides such good mixing of the catalyst and raw fluid into a homogeneous mixture that no further mixing is necessary for the reaction. The reaction can be completed in the retention vessel in e.g., 6.8 minutes. The inclined but relatively low acute angle enables the glycerin to flow out the bottom through a pipe **52*a* to a waste or storage tank or to further de-menthalization and refinement. The biodiesel can flow out the top of the retention vessel through a pipe 54 to the heat exchanger or to an optional second loop reactor. The pressure on the entire plant system is created by the feed pump 20 and held by the relief valve 58**.

In a preferred embodiment, a liquid and air separator 64 may be used to remove any entrained air, or even more preferably a pressure relief valve (e.g., 40 psi) may be used to limit venting and thus maintain methanol in the flow through the plant.

Since the entire system is sealed, methanol vapors are kept in. Normally, methanol boil's at 149° F. at one atmosphere. However, at 40 psi, methanol will not boil even at 190° F. (The pressure and temperature are preferably above ambient, with the temperature of the feed stock being about as high as possible given the pressure being sufficient given the temperature so that the methanol stays in a liquid state.) In addition, after the liquid passes through heat exchanger 22 and a pressure valve 58 or relief valve, it has been cooled to below the methanol boiling point at one atmosphere, e.g., to 140° F.

Further, in the reactor, because the pump is recirculating and is not pumping against any substantial head, the pump is very efficient. In the preferred embodiment, a pump operating at 3 HP really only consumes about twenty five percent of the power it would otherwise used and thus is the equivalent of about a 0.75 HP pump. The centrifugal pump is preferred for the reactor pump because its impeller vanes serve to help mix the fluid.

As noted above, if the system is constructed from stainless steel, higher temperatures and pressures may be achieved, and the system can use more of or all raw material having high free fatty acids, such as tallow in a two loop reactor system. In such a case, in addition to the methanol, it would be desirable to use sulfuric acid as a catalyst in the first loop reactor and an alkaline catalyst and methanol in the second loop reactor (see FIG. 11—"optional $2^{nd}$ loop reactor").

In view of the above, it is evident that pressure, temperature, recirculation time feed rate, and/or retention time may be varied as desired depending on the input materials, catalysts, desired grade of biodiesel fuel, and other factors. In the preferred embodiment, the total reaction time is about 8.7 minutes (1.9 minutes in the loop reactor and 6.8 minutes in the retention vessel).

Figure 9:
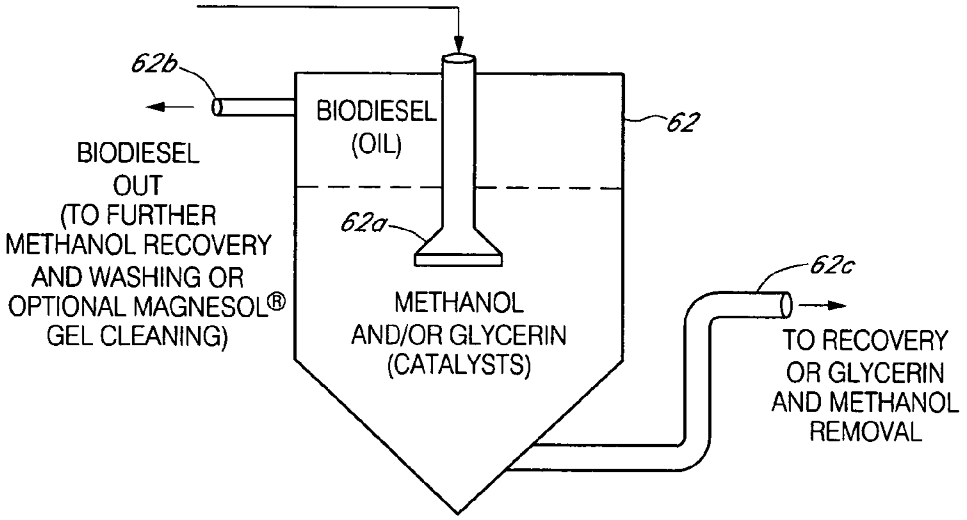
FIG. 9 is a schematic view of a settler tank.

In the case of feed stock which is very high in free fatty acids, such as all or a high percentage of tallow or yellow grease, it is an option to add another loop reactor after the retention vessel 52 or settler tank 62. As shown in FIG. 9, separator 62 is the same as or similar to as in the continuous flow application.

Figure 10:
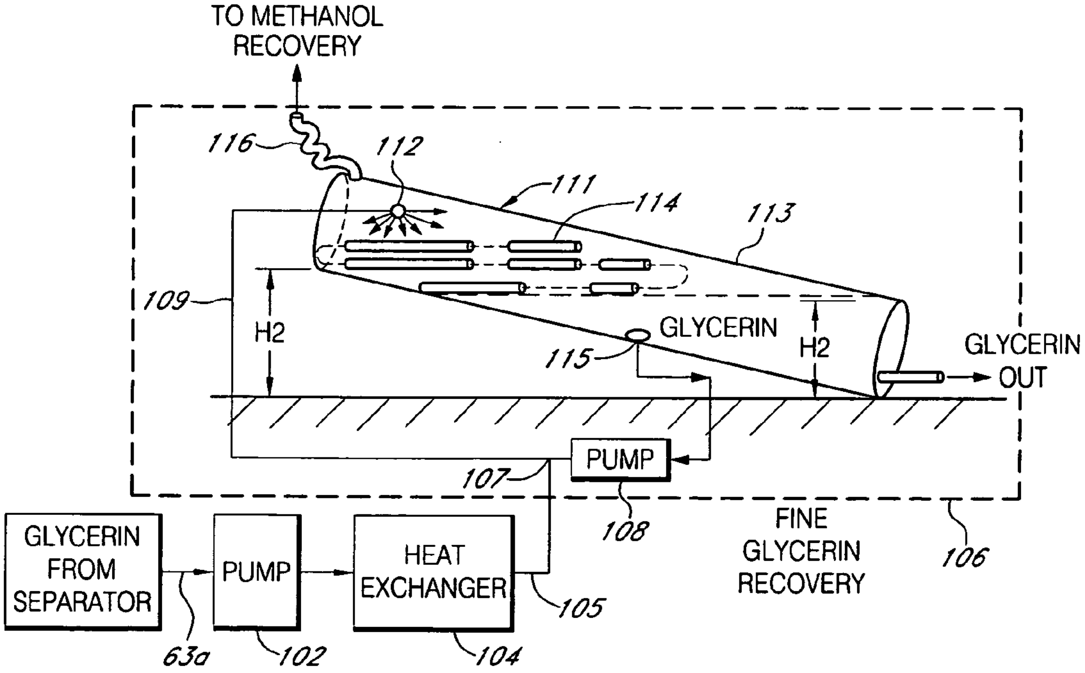
FIG. 10 is a schematic view of a separator for fine glycerin recovery in accordance with another embodiment of the invention.

As also shown in FIG. 9, the biodiesel in the separator tank 62 is taken out at outlet **62*b* and the methanol and/or glycerin is taken from the bottom at outlet 62*c*. A typical separation time is one to four hours. The glycerin normally has methanol remaining in it. To recover the glycerin and methanol separately, a special separator 111 as shown in FIG. 10 may be used. FIG. 10**A is a schematic view of a preferred version of a separator which may be used for biodiesel de-methalization.

Figure 11:
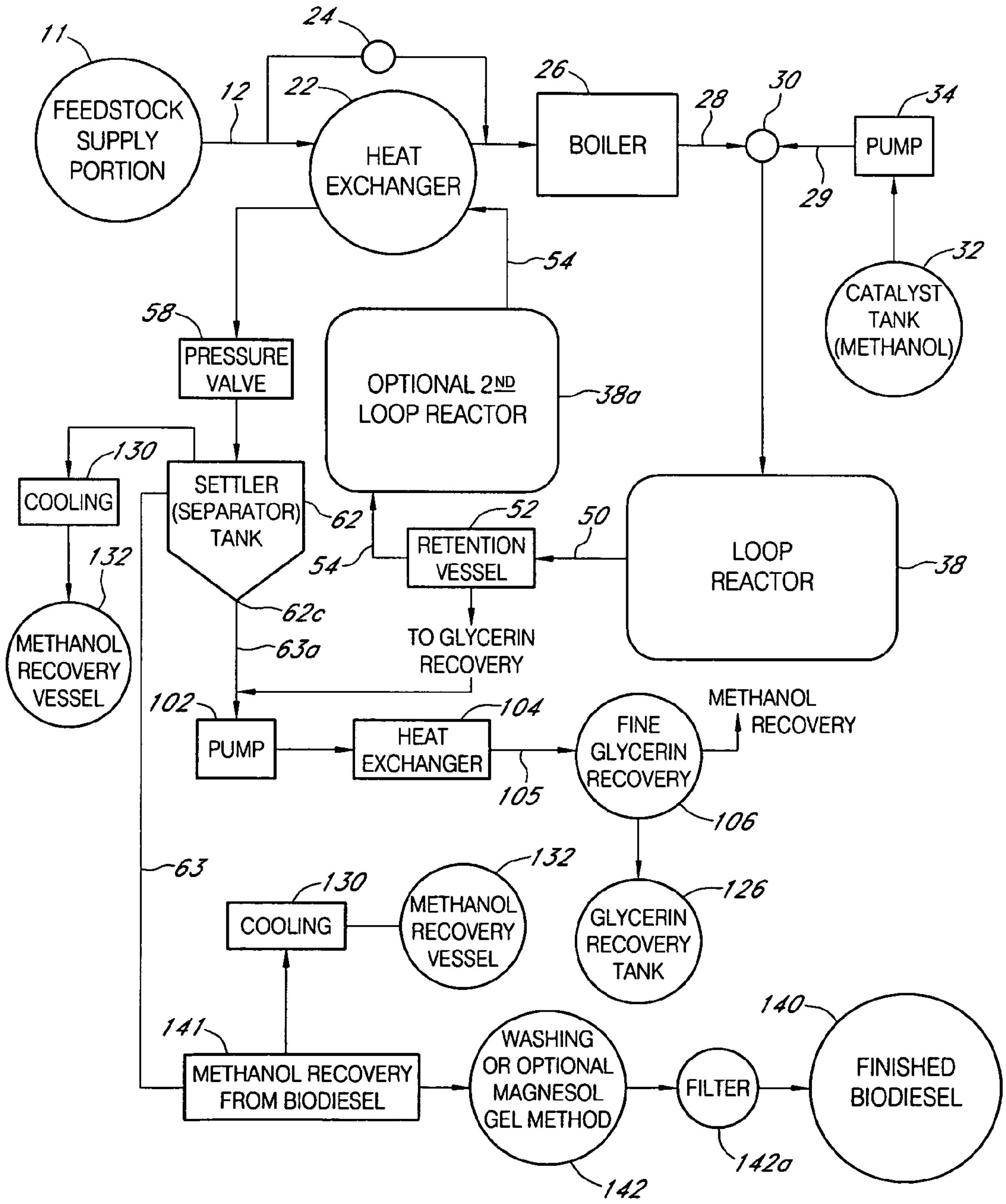
FIG. 11 is a schematic view of an overall plant for making biodiesel fuel in accordance with the preferred embodiment of FIGS. 1, 2 and 3.
Figure 12:
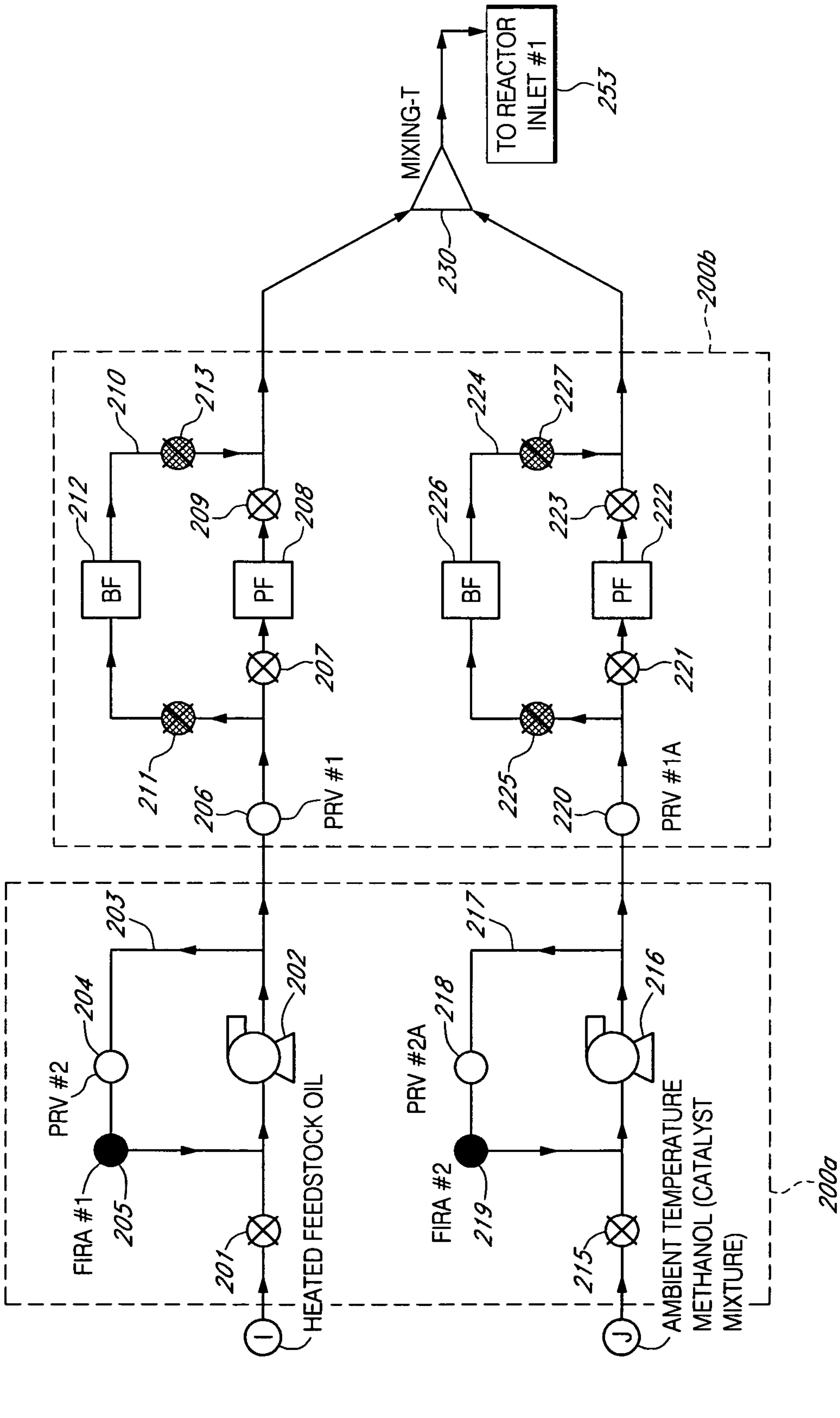
FIG. 12 is a schematic diagram of a variation of a mixing portion of the biodiesel plant in accordance with another embodiment of the invention where heated feed stock is mixed with catalyst prior to passing to the reactor.

Glycerin with some methanol still in it from the settler tank (separator 62) and from elsewhere in the plant, e.g., retention vessel 52, pass through conduit 63*a* and are pumped by pump 102 through a heat exchanger 104 and through a conduit 105 to a fine glycerin recovery portion 106 of the plant. Specifically, the glycerin passes through a T fitting 107 up to a misting head 112 inside a long pipe 113 or vessel, which is angled. The mist passes onto heated tubes or pipes 114 that are at very high temperature, e.g., at or over 200° F., sufficient to readily boil off methanol. The glycerin than collects in the bottom portions of the slanted pipe 113. At a desired point 115, e.g., about halfway along the vessel, glycerin is taken out of the vessel and pumped by a pump 108 through T-fitting 107 and sent back to the mist head 112. Thus, much of the glycerin is recirculated to help ensure that all the methanol is boiled off. Relatively pure glycerin (and some free fatty acids) are removed at the bottom of the tilted pipe 113. Heat exchanger 104 may heat the glycerin to a very high temperature, also preferably at or over 200° F. Pump 102 need only be a small pump e.g., ⅓ HP, compared to the pumps for the loop reactor and/or the plant feed stock. Pump 108 also can be relatively small, e.g., ⅓ HP. This process "de-methalates" the glycerin so it is environmentally much easier to handle, and then may be sent to a recovery tank 126 (FIG. 11). The vessel or pipe 113 should be built to withstand relatively high pressure, e.g., from 50 to 150 psi. An exemplary vessel holds 800 gallons of glycerin. Then, pump 108 will circulate glycerin until stack (116) temperature falls from 200+ degrees to approximately 150 degrees Farenheit, indicating that no more methanol is being evaporated.

The boiled methanol fumes are at a temperature at or above the boiling point, generally about 180° F. to 200° F. in the example. The methanol vapors pass up through a pipe (stack 116) where the vapor is sent to a cooling tower and any liquid condenses. The methanol may pass through a cooling chamber (tower 130) using water spray and/or fans or other cooling mechanism to liquefy the methanol and create its own vacuum so that it can be sent to the recovery vessel 132 without a pressure build up. A vacuum pump can also be added to the system to accelerate methanol recovery.

The biodiesel passing from settler tank 62 through conduit 63 then enters methanol recovery unit 141. Methanol vapors are condensed in the cooling tower 130 and are stored for reuse in methanol recovery vessel 132. The de-methalated biodiesel then enters the cleaning process at washing or optional Magnesol® (magnesium silicate and in particular, an adsorbent synthetic magnesium silicate, manufactured by The Dallas Group of America, Inc.) gel device 142 and the finished biodiesel is stored in a tank 140, after passing through filter 142*a* (for the optional gel method).

In the cleaning process, in a most preferred embodiment, rather than just 1 to 2 percent Magnesol®, use of 0.5 to 1.0 percent Magnesol® combined with about 3 to 4 gallons of water for about 800 gallons of biodiesel results in a reaction removing methanol and other impurities to reach ASTM specifications or better within about 15 minutes and possibly as low as 5 minutes or less. The addition of acid(s) to neutralize salts from the biodiesel process and biodiesel impurities helps speed up the reaction, as does heat. The Magnesol® and impurities are removed from the biodiesel by e.g., putting the mixture in a cone shaped tank for about 10 minutes. The Magnesol® with impurities drops out quickly due to its weight. Then, the biodiesel is drained from the tank and passed through a series of filters to remove any remaining Magnesol® with entrained impurities in it.

To wash the crude biodiesel, conventional processes may be used. Alternatively, a process using Magnesol® and water may be used as described in U.S. patent application Ser. No. 11/048,265, by the same inventor, incorporated by reference herein.

Using a plant in accordance with the invention, ASTM standard biodiesel, no more than 0.02 percent free glycerin and 0.24 percent total glycerin, was readily achieved, without any further processing.

Anyone skilled in the art can utilize the loop reactor in many configurations. The loop reactor can be mounted in any plane (x, y, z) and in any geometrical piping layout, i.e., double loops, bent around corners, circular spirals, etc.

Figure 4:
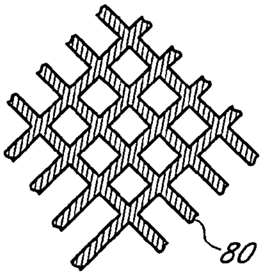
FIG. 4 is a view of a portion of mesh used in the loop reactor of FIG. 2.
Figure 5:
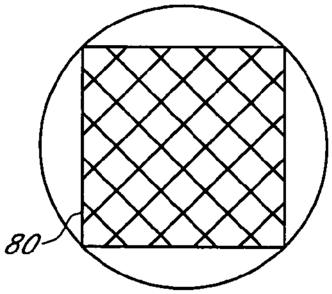
FIGS. 5 and 6 are schematic cross sectional views of a first portion of the loop reactor of FIG. 2 where the mesh is oriented in a first rotational orientation and a second portion of the loop reactor of FIG. 2 where the mesh is oriented in a second rotational orientation forty five degrees from the first rotational orientation.
Figure 6:
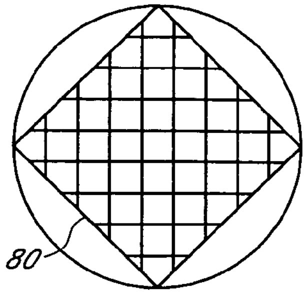

A loop reactor may be built in any size. The inventor has built, e.g., out of eight inch (8") stainless steel pipe and a total loop length of thirty six feet (36'), with a twenty horse power (20 HP) pump, pumping 800 gpm thru the loop. The loop was filled with angular expanded stainless steel diamond shaped mesh 80. FIG. 4. As shown in FIGS. 5 and 6, the diamond mesh may be oriented at a first orientation (FIG. 5) in one place in the loop reactor and in a second place in the loop reactor the mesh may be oriented at a second orientation (FIG. 6) e.g., forty five degrees (45°) from the first orientation.

The expanded plate was cut into six inch (6") wide strips (of eight feet long) and bent at forty five degree (45°) angles along the length of the inside of the eight inch (8") pipe. This configuration causes tens of thousands of eddy currents along the flow of the fast moving fluid and serves as a super blending device. As before, the fluid is pressurized by the external feed pump at whatever pressure is desired to attain higher reaction temperatures and to ensure that the boiling point of the methanol catalyst is not reached. The higher the temperature, the faster the reaction time that is achieved, so the higher the pressure to keep the methanol from boiling. The loop reactors super blending action ensures that the catalyst and feed stock oils are swiftly made homogenous.

At 800 gpm, pump 42 requires very little power because its suction intake is being fed by its own pressure outlet. The only resistance the pump pressure encounters is that from the expanded metal plates in the eight inch (8") pipe. In actual operation, the twenty horse power (20 HP) pump 42 only requires about six horse power (6 HP) to operate. The pipe pressure is supplied by the external feed pump 20, which is only pumping fifteen gallons per minute (15 gpm), in this embodiment.

At this rate, approximately seven and a half million (7,500,000) gallons per year of biodiesel fuel can be produced. The volume of the loop reactor is approximately ninty (90) gallons. Therefore, the fluid loops through the twenty horse power (20 HP) pump approximately six (6) times per minute and passes through the maze of expanded metal plates in the eight inch (8") pipe loop reactor six (6) times per minute. At a feed rate of fifteen gallons per minute (15 gpm), the average time the feed stock is in the loop is 90 gallons divided by 15 gpm, which equals 6 minutes. Therefore, the feed stock passes around the loop and pump vanes an average of thirty six times (6×6=36). This ensures a homogenous mixture of reactants. The temperature in a stainless steel system may be over two hundred degrees Fahrenheit (200° F.). Under such conditions, the reaction will take place in less than four (4) minutes. The system is capable of much higher pressures and temperatures, even if built with off-the-shelf materials. Therefore, the loop reactor when pushed to even higher limits will significantly reduce reaction times even further. This will increase the throughput of the plant to greater production volumes utilizing the same equipment. The loop reactor is truly a major advancement in biodiesel production.

In actual operation, which was tested in a continuous run at the ABF Bakersfield plant, two loop reactors were used and the previously described inclined pipe tube retention vessel/separator to remove the glycerin, which vessel was located between the two loop reactors. It is important to note that the same feed pump will provide the pressure through the first reactor, to the inclined separator, and then the second loop reactor through the temperature reducing heat exchanger and the pressure valve into atmospheric pressure at temperatures below boiling point of methanol, which is at 149° F.

Figure 7:
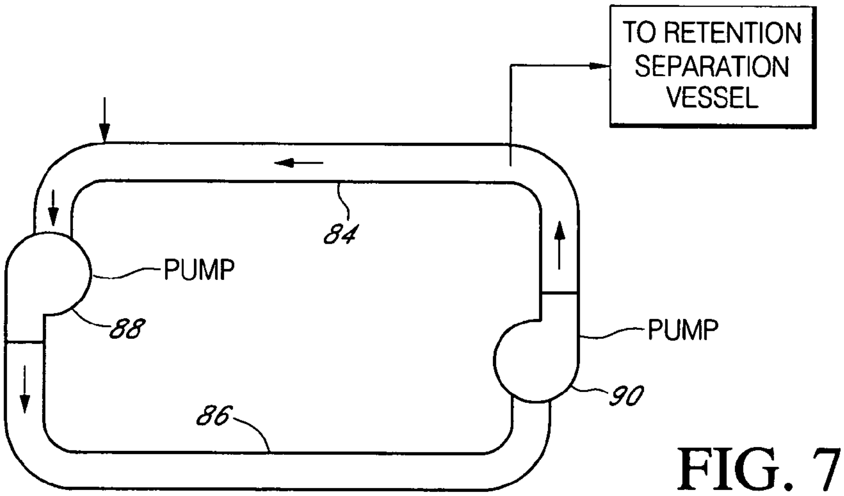
FIG. 7 is a schematic view of an alternative embodiment of the loop reactor.
Figure 7A:
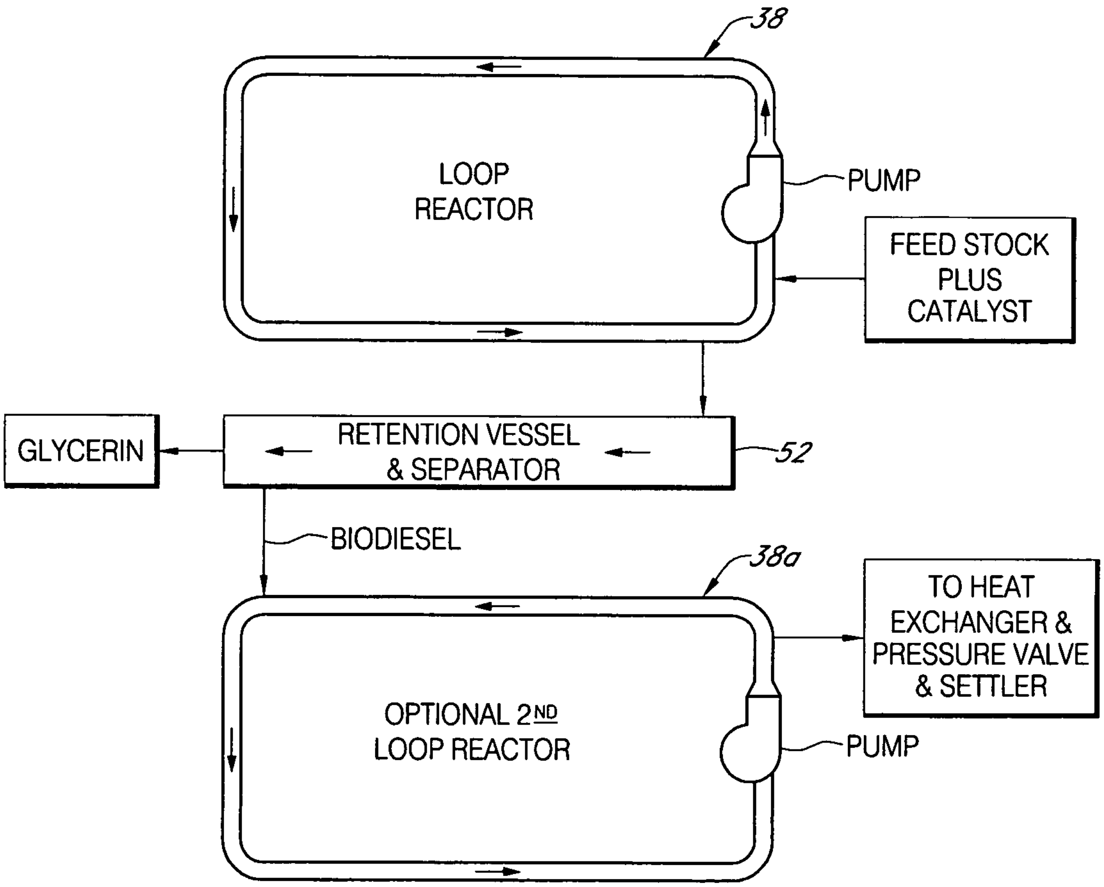
FIG. 7A is a schematic view of another alternative embodiment of a double loop reactor with a separator between reactor loops.

A design for a double loop reactor is shown in FIG. 7A. An alternate loop reactor is shown in FIG. 7 with two pumps that feed each other. That is, there are two long parallel pipes 84, 86, which could be placed straight or run around inside perimeter walls of an industrial building. Ends of each pipe 84, 86 would be connected to a high volume pump 88, 90, which pumps would feed each other.

The pressure side of each pump will feed the intake of the other pipes, which would be insulated. This system would act just as the single pump loop reactor except higher volume's could be run with the fluid running through two spinning pump vanes on each complete loop. These parallel pipe runs 84, 86 could also be placed in a vertical position to run up the walls and through the ceiling and down the other wall on the opposite side of the building. The pipes could also be run underground to the opposite side of the building.

Figure 8:
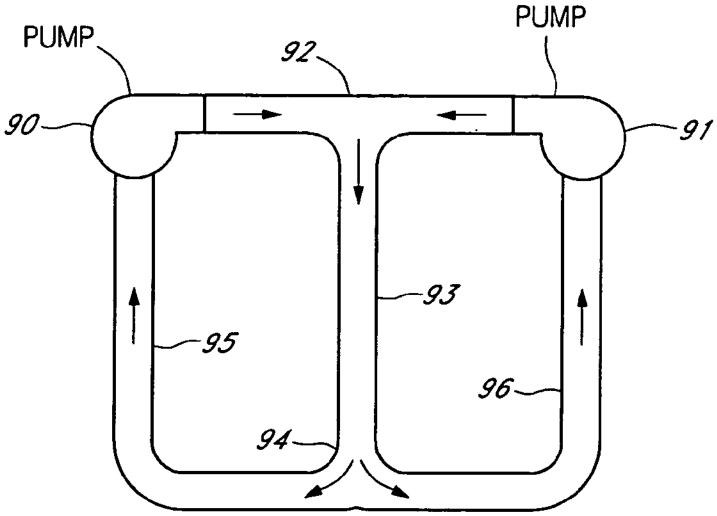
FIG. 8 is a schematic view of a further alternative embodiment of the loop reactor.

Another embodiment of a loop reactor is shown in FIG. 8. In this embodiment, two equal size pumps 90, 91 that pump the pressure outlet directly toward each other are used. After the collision of the fluids, the total volume would exit via a T connection 92 into a single pipe 93. At the end of this single pipe would be a Y connection 94 that will split the liquid flow into two separate pipes 95, 96 and thus two separate flows each of which will return to one of the inlets of each of the pumps. The violent collision action of the two pumps will greatly enhance homogenous mixing. It is possible that a high temperature (excess of 250° F.) and pressure system of this type with very short time requirements to reach complete homogenous mixing, will produce relatively small efficient reactor systems to produce very high volumes of completely reacted crude biodiesel that is ready for final cleaning.

It should be noted that loop reactors can be used in series or in parallel, or in any combinations of the two to provide system flexibility. Also at the ABF Bakersfield Plant, two loop reactors were used in series with the glycerin removed between reactors. It was also discovered that if 80 percent of the required catalyst was used in the first reactor and the balance of 20 percent of the catalyst was introduced in to the second reactor after the glycerin was removed, the reaction was pushed even further. The first reactor produced ASTM grade glycerin specifications and the second reactor pushed the reaction to produce some of the best biodiesel ASTM glycerin specifications ever achieved in the industry.

Further variations of the biodiesel plant and loop reactor of preferred embodiments of the invention are described below with reference to FIGS. 12-23. In these embodiments, the raw ingredients may be blended tallow and soy bean oil, such as in connection with FIG. 1 described above. In fact, point I of FIG. 12 may represent line 28 of FIG. 2. Catalyst, such as methanol, may enter at point J, which comes from line 29 of FIG. 2.

At point I, feed stock, is preferably already heated, e.g., to under 200° F., or 200° F. or even over 200° F. (but preferably not left at that temperature for more than forty-eight hours, otherwise the feed stock will usually begin to oxidize into free fatty acids). The heated feed stock passes a normally open valve 201 (e.g., a hand valve) and is fed by a pump 202, preferably adjustable. There is a bypass loop 103, for safety. Loop 203 contains a pressure relief valve 204 (PRV #2) and a flow indicator relay alarm 205 (FIRA #1). After pump 202, there is a pressure relief valve 206 (PRV #1). PRV #1 may be set at 60 psi, while PRV #2 may be set at 75 psi, for example.

After valve 206, there is a valve 207, which is normally open and preferably a hand valve. A flow meter 208 (primary flow meter PF) follows valve 207, and another normally open valve 209, preferably a hand valve too, follows flow meter 208. Thereafter, the feed stock passes to a mixing T 230, which may be the same as static mixer 30 of FIG. 2. Primary flow meter 208 may be bypassed by closing valves 207 and 209, and using a bypass loop 210. To use loop 210, normally closed valve 211 is opened, and so is normally closed valve 213, allowing flow along loop 210 through a flow meter 212 (bypass flow meter BF).

A catalyst mixture including methanol and a catalyst, preferably at ambient temperature, enters at point J (as noted above) and flows past a normally open valve 215 (e.g., a hand valve), then a pump 216, which is preferably an adjustable feed pump. The mixture of methanol with catalyst and feed stock at the T 230 is set by the relative pump rates of pump 202 and pump 216. After pump 216, there may be a bypass circuit 217 which functions as a safety circuit, like circuit 203. There is a pressure relief valve 218 (PRV #2A) and a flow indicator relay alarm 219 (FIRA #2).

Following pump 216, in the case of normal operation, there is a pressure relief valve 220 (PRV #1A), a normally open valve 221, a flow meter 222, e.g., a primary flow meter (PF), and another normally open valve 223. Valves 221, 223 may be hand valves. Like the feed line, this catalyst line may have a bypass loop 224 having a normally closed valve 225, a flow meter 226 (bypass flow meter BF), and another normally closed valve 227. Valves 225, 227 may also be hand valves. PRV #1A may be set at 60 psi and PRV #2A may be set at 75 psi, for example.

Both the feed line, point I to mixing T 230 and the catalyst line, point J to mixing T 230, preferably will also have pressure and temperature gauges before the mixing T (in both lines), and a pressure and a temperature gauge should also be located following mixing T 230.

It is a good idea to have an accurate adjustable flow rate pump for feed stock and methanol catalyst lines with self-checking flow meters to insure that the desired mixture rate is maintained. For example, the bypass flow meters installed along side the primary flow meters enable an operator to check flows (by comparing bypass flows) through the bypass flow meters.

The above design achieves a safer plant because of the incorporation of inexpensive redundant systems and dual acting safety devices which are easy to operate. Moreover, the system is extremely versatile, because it is very easy to change flow rates and other operating parameters, such as pressure and temperature.

Figure 13:
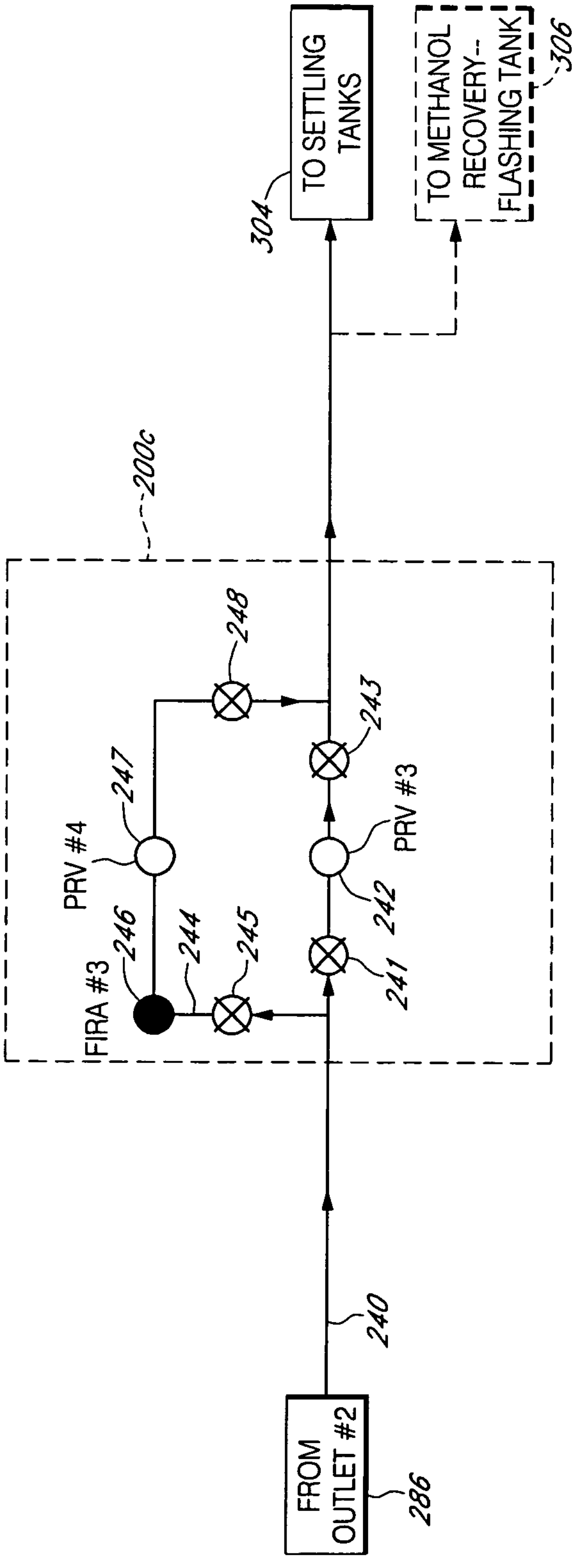
FIG. 13 is a schematic diagram of an outlet portion of the biodiesel plant in accordance with another embodiment of the invention where output from the reactor is pressure controlled.
Figure 16:
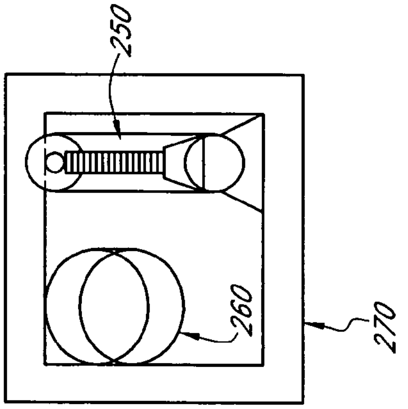
FIG. 16 is a schematic side view of the reactor of FIG. 14.
Figure 14:
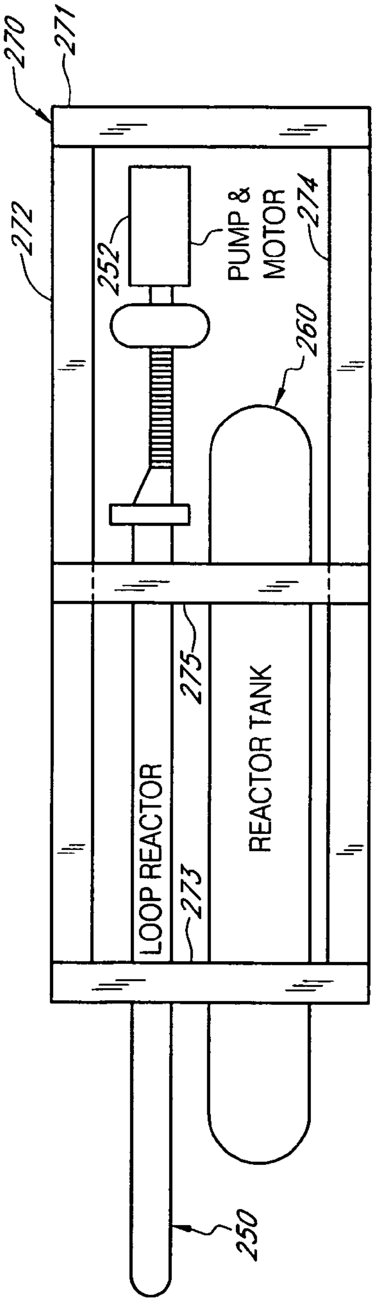
FIG. 14 is a schematic top view of a reactor in the biodiesel plant in accordance with a further embodiment of the invention.

With reference to FIG. 13, output of the treated feed stock from the reactor passes along a line 240 to a normally open valve 241, then a pressure relief valve 242 (PRV #3) followed by another normally open valve 243. Valves 241 and 243 may be hand valves.

Also, in parallel, there is a bypass loop 244 having a normally open valve 245, a flow indicator relay alarm 246 (FIRA #3), a pressure relief valve 247 (PRV #4) and another normally open valve 248. Flow out of the line 240 goes to either a heat exchanger for cooling or to a flash tank at about reactor temperatures (i.e., uncooled) for processing.

Also, for safety, pumps should be equipped with an adjustable overpressure bypass flow valve. Some pumps (i.e. gear pumps, positive displacement pumps, etc.) already have them built in. However, it is easy to install one (see FIG. 12).

Pressure relief valves #1 and #1A can be set at operating pressure, e.g., 60 psi, and pressure relief valves #2 and #2A in bypass circuits can be set at 75 psi. Therefore, if relief valve #1 or #1A fails, or someone fails to open a valve downstream in the system, e.g., during maintenance or operator error or temporary shutdown, the bypass relief valve will protect the system. Also, under normal operations there would not be any flow through the bypass systems. If relief valves #2 or #2A begins to operate, there is something going wrong in the system. Therefore, any flow in the bypass system should be monitored by an alarm system (flow indicates relay alarms #1 and #2) to notify operators. A simple flow actuated relay can perform this function. Therefore, this simple system can provide both operational and safety control.

The entire system is kept at a predetermined temperature and pressure. The pressure in the system is maintained between the pressure relief valves #1 and #1A and the pressure relief valve PRV #3 at the exit of the continuous flow system as outlined in several alternative modifications. Wherever the outlet pressure release valve is located, i.e. where system pressure is reduced to atmospheric pressure, we must install a similar pressure reducing bypass system is preferably installed (see FIG. 13).

For example, if system pressure is to be maintained at 60 psi then PRV #3 is set at 60 psi and PRV #4 is set at 75 psi. Again if PRV #4 goes into operation it means that PRV #3 has failed. An alarm system (FIRA #3) should notify an operator of the failure.

If both PRV #3 and PRV #4 have hand operated valves both ahead and downstream, then operators can change any failed bypass valve without shutting down the plant (see FIG. 13).

The type of feed pumps used is important for the system. For example, positive displacement pumps or piston pumps tend to pulse the entire system, making flow meters sometimes erratic and also may cause bypass relief valves to operate intermittently. This also causes unnecessary strain on the whole continuous flow process. If you are using these types of pumps, air shock absorbers should be installed in the system. These may be constructed as follows:

A vertically installed closed ended pipe full of air attached above a horizontal liquid flowing pipe will accomplish this function. When the system is at operational pressure the column of air in the vertical pipe will compress to 60 psi (where the PRV is set at 60 psi). Any instantaneous pressure pulses to the system will be mostly absorbed by the air shock absorber and result in a more even flow to the system.

It is sometimes useful to perform a systems failure analysis on different types of simulations on multiple component failures. An example is below.

Assume that PRV #3 fails therefore raising system pressure to 75 psi through PRV #4. The plant will continue to operate at 75 psi through PRV #4 and FIRA #3 will notify the operator that this has occurred. The operator can change the failed PRV without shutting down the plant by closing the hand operated valves 241 and 243 to cut off flow to PRV #3 during replacement. If FIRA #3 also malfunctions, the system will continue to operate. The operator may notice a rise in system pressure by looking at mechanical pressure gauges upstream from the reactor (probably increasing from 60 psi to approximately 75 psi). What happens then if PRV #4 also fails? Then flow in the system will stop, and pump pressure on both the feed stock pump and catalyst pump will suddenly rise beyond 80 psi and activate their individual bypass circuits and trigger their own FIRA #1' and FIRA #2, thus notifying the operator to shut down the plant. The operator has plenty of time to shut down the plant because the bypass circuits on the feed stock and catalyst pumps have in effect shut down flow to the plant. This would be a quadruple contingency failure protection system.

The reactor is tremendously versatile, capable of operating at very high temperatures and pressures (if required) and has cyclone like mixing rates. In addition, such reactor requires almost no maintenance and only low energy requirements.

The reactor's operation is transparent to the processing system. Ingress and egress of liquid flows to and from the reactor have no effect on system pressure or system flows.

The plant's versatility enables tuning to the exact parameters required for the desired feed stock. Incorporating real-time biodiesel analysis is helpful in this regard.

Using such a plant, triglycerides may be reduced to essentially zero or 0.000% mass.

By implementing such a system, the reactor may be fine tuned to produce high quality biodiesel and reduce use of excess methanol catalyst yet increase flow-processing rates, which ultimately transforms to increase efficiency and profits.

With reference to FIGS. 14-19, flow through the reactor 250 and reactor tank 260. In a preferred embodiment, reactor 250 and reactor tank 260 are supported by a frame 270, preferably of metal tubing, e.g., six inch square steel tuping, formed by tubes 271, 272, 273, 274; 275 and 276, and additional members (not shown) such as below members 273 and 275. In addition, there may be metal plates welded or other fixed such as by bolts to the frame for supporting the reactor tank 260 and loop reactor 250. Frame 270 may also support by a plate or base 254 a pump and motor 252 for the loop reactor 250.

Reactor 250 and reactor tank 260 work as described above with respect to reactor 38 and retention vessel 52, respectively. It is also noted that the reactor has in inlet pipe 253 (Inlet #1), e.g., a one and one half inch pipe, and the reactor may be made of eight inch pipe 255, e.g., of stainless steel. Flexible pipe may be used for an inlet pipeline 256 from pump 252 and also for an outlet pipeline 257 from the loop reactor past the pump to the inlet 256. The flexible pipe may be, e.g., stainless steel such as four inch for the outlet 257 and six inch for the inlet 256.

Figure 19:
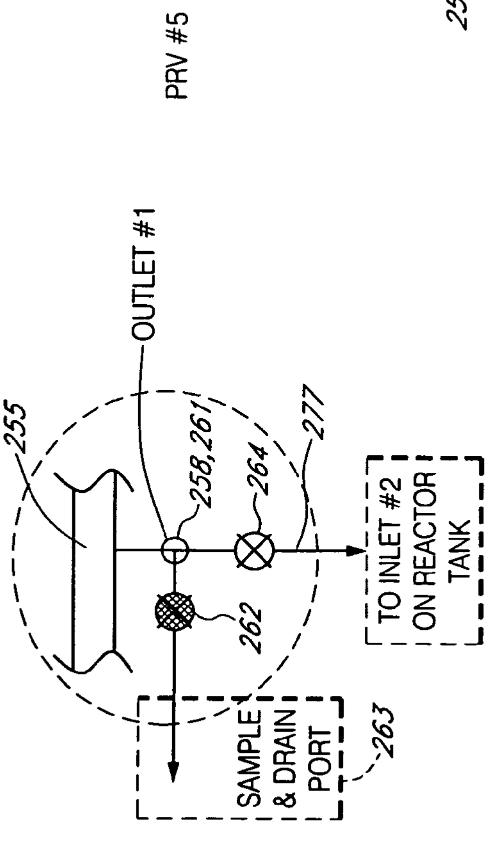
FIG. 19 is a schematic view of an outlet portion of the reactor of FIGS. 14 and 17.

An outlet 258 (outlet #1) from reactor 250 is shown in detail in FIG. 19. There is a T-connector 261 at outlet 258. One path of the T-connector may lead to a normally closed valve 262 for a sample and drain part 263. Valve 262 may be a hand valve. The other path from T-connector 261 goes to a normally open valve 264 (which may be a hand valve) and on to reactor tank 260, to Inlet #2.

Figure 18:
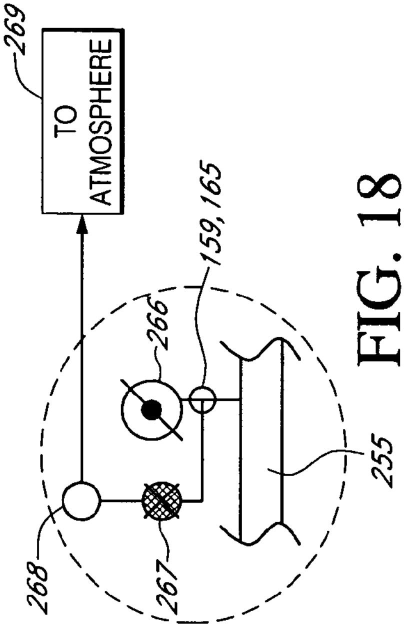
FIG. 18 is a schematic view of a vent outlet portion of the reactor of FIGS. 14 and 17.
Figure 17:
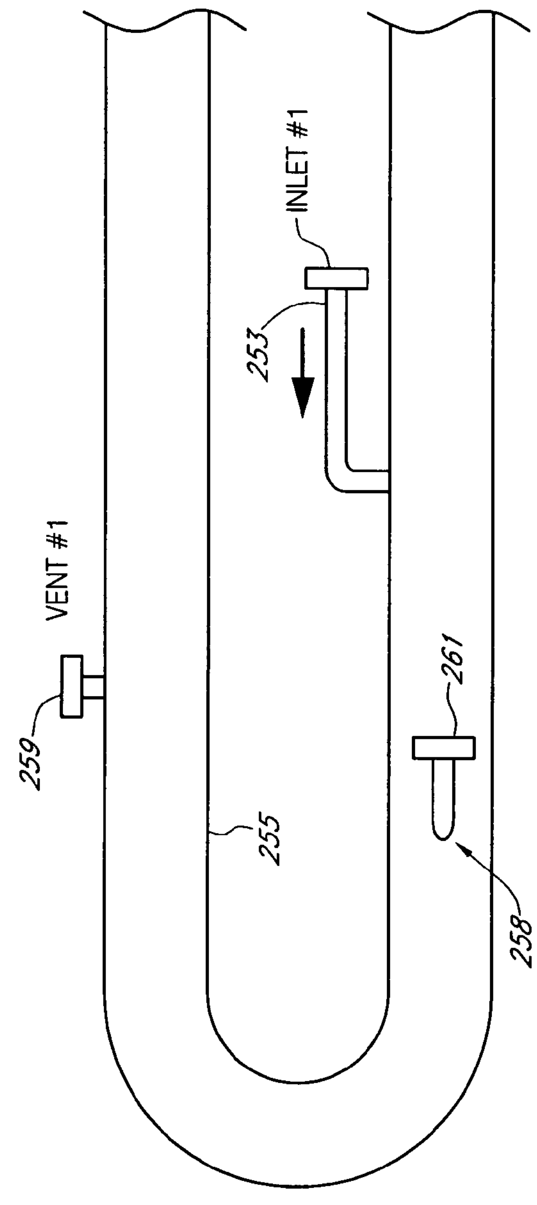
FIG. 17 is an enlarged front schematic view of a portion of the reactor of FIG. 14.

Reactor 250 preferably has a vent 259, shown in detail in FIG. 18. Vent 259 has a T-connector 265. One path leads to a temperature gauge 266, e.g., measuring from 0° F. to 240° F. and using a probe, e.g., of nine inches into the vent. The other path from T-connector 265 has a normally closed valve 267, e.g., a hand valve, followed by a pressure relief valve 268 (PRV #5, e.g., set to 40 psi, and is followed by a line venting to atmosphere 269.

The reacted feed stock leaving Outlet #1 and going to Inlet #2 on the reactor tank 260 may pass through a line 277 which, e.g., is a one and a half inch stainless steel flexible hose. In a preferred embodiment, the reactor is about eighteen feet four inches long and the cross-section is about four feet wide by four feet tall.

Figure 15:
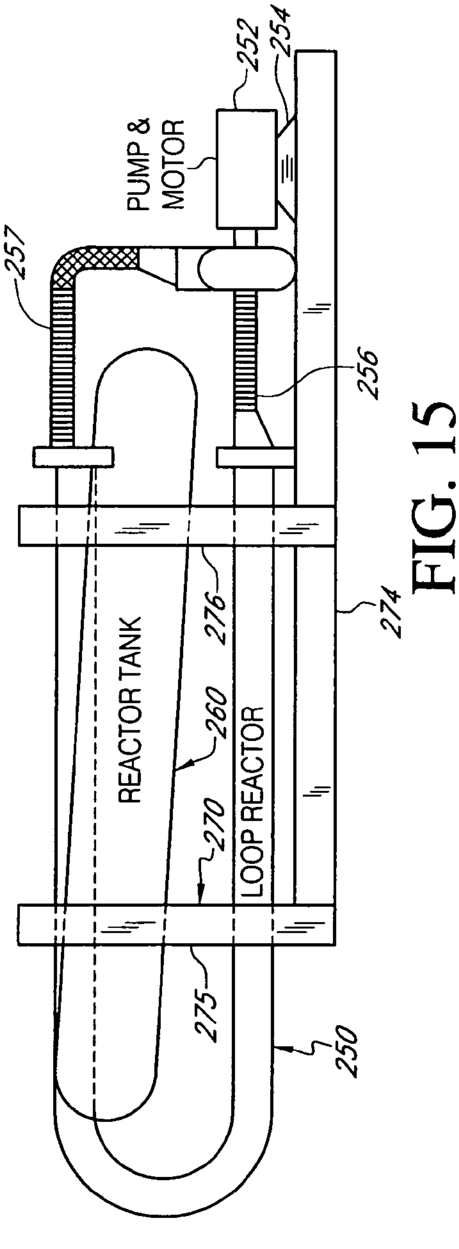
FIG. 15 is a schematic front view of the reactor of FIG. 14.
Figure 20:
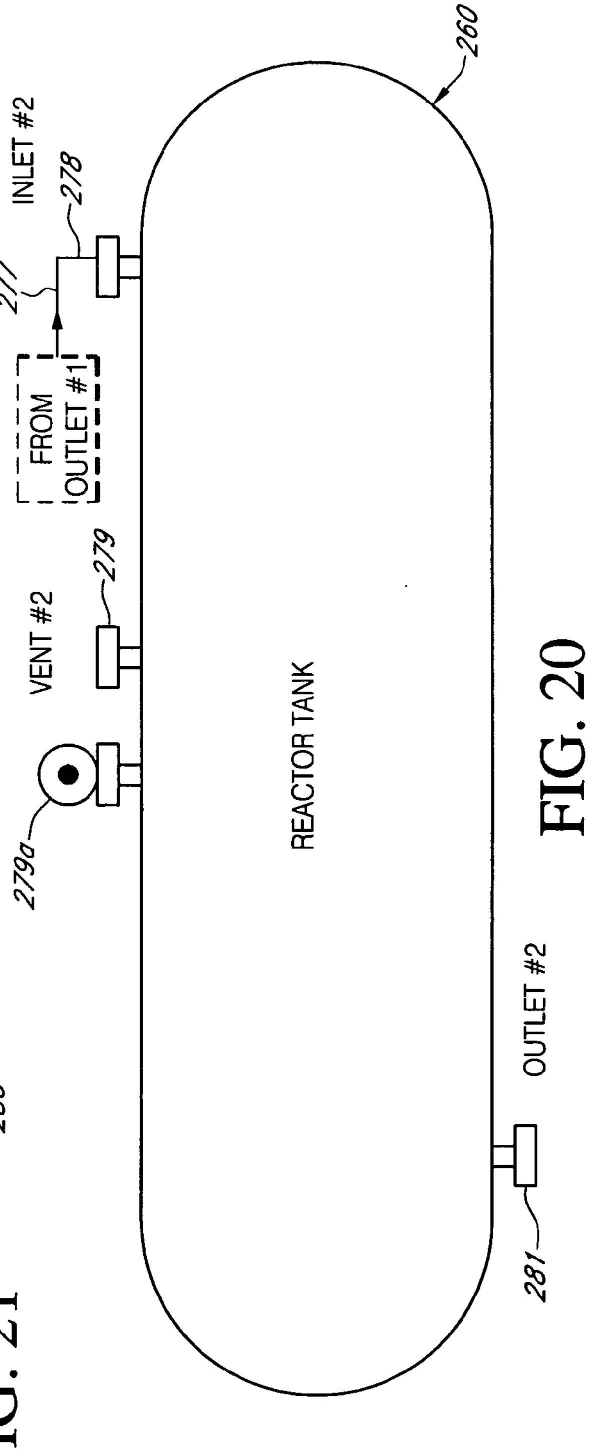
FIG. 20 is a front schematic view of a reactor tank in the reactor of FIG. 14.

Reactor tank 260 is shown in FIG. 20. Reacted feed stock (biodiesel with glycerin and any unreacted methanol and catalyst) from reactor 250 goes through outlet #1 (outlet 258)

and enters inlet 278 (Inlet #2). Reactor tank 260 is set at an angle (tilted) as best shown in FIG. 15. The tank 260 may be an eighteen inch iron tank, or it may be stainless steel. The tank provides for continued reaction under elevated pressure and temperature and for separation of crude biodiesel. Preferably tank 260 has a vent 279 (Vent #2) and a pressure gauge 279*a* at its top for measuring, e.g., from 0 to 100 psi. At the bottom there is an outlet 281 (Outlet #2). Outlet #2 is shown in more detail in FIG. 21. Outlet 281 has a T-connector 282 which has one path to a normally closed valve 283 (which may be a hand valve) followed by a sample and drain port 184. The other path goes to a normally open valve 285 (which may be a hand valve) followed by a connection 286 to line 240, e.g., by a flexible or rigid one and one half inch pipe, e.g., of stainless steel.

Figure 22:
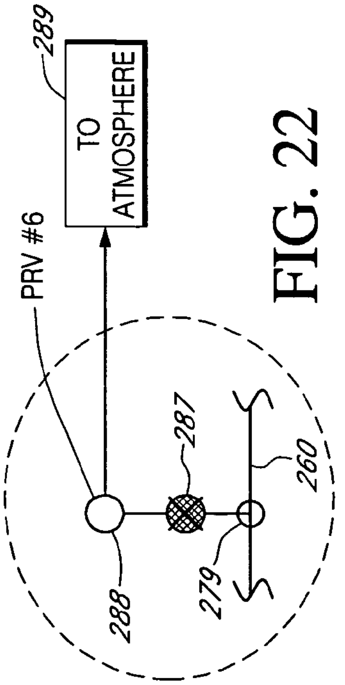
FIG. 22 is a schematic view of a vent outlet of the reactor tank of FIGS. 14 and 20.
Figure 21:
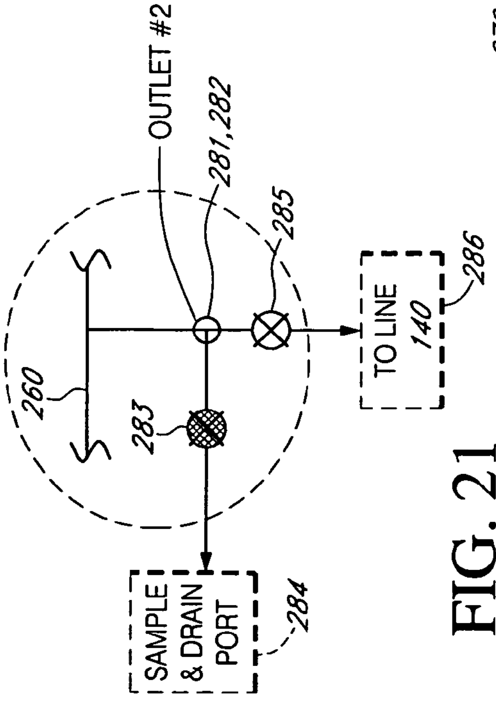
FIG. 21 is a schematic view of an outlet portion of the reactor tank of FIGS. 14 and 20.

FIG. 22 show details of Vent #2. Vapor passing into Vent #2 (vent 279) meets a normally closed valve 287, which may be a hand valve. Beyond valve 287 is a pressure relief valve 288 (PRV #6), preferably set at 40 psi, which would then vent to atmosphere 289.

Figure 23:
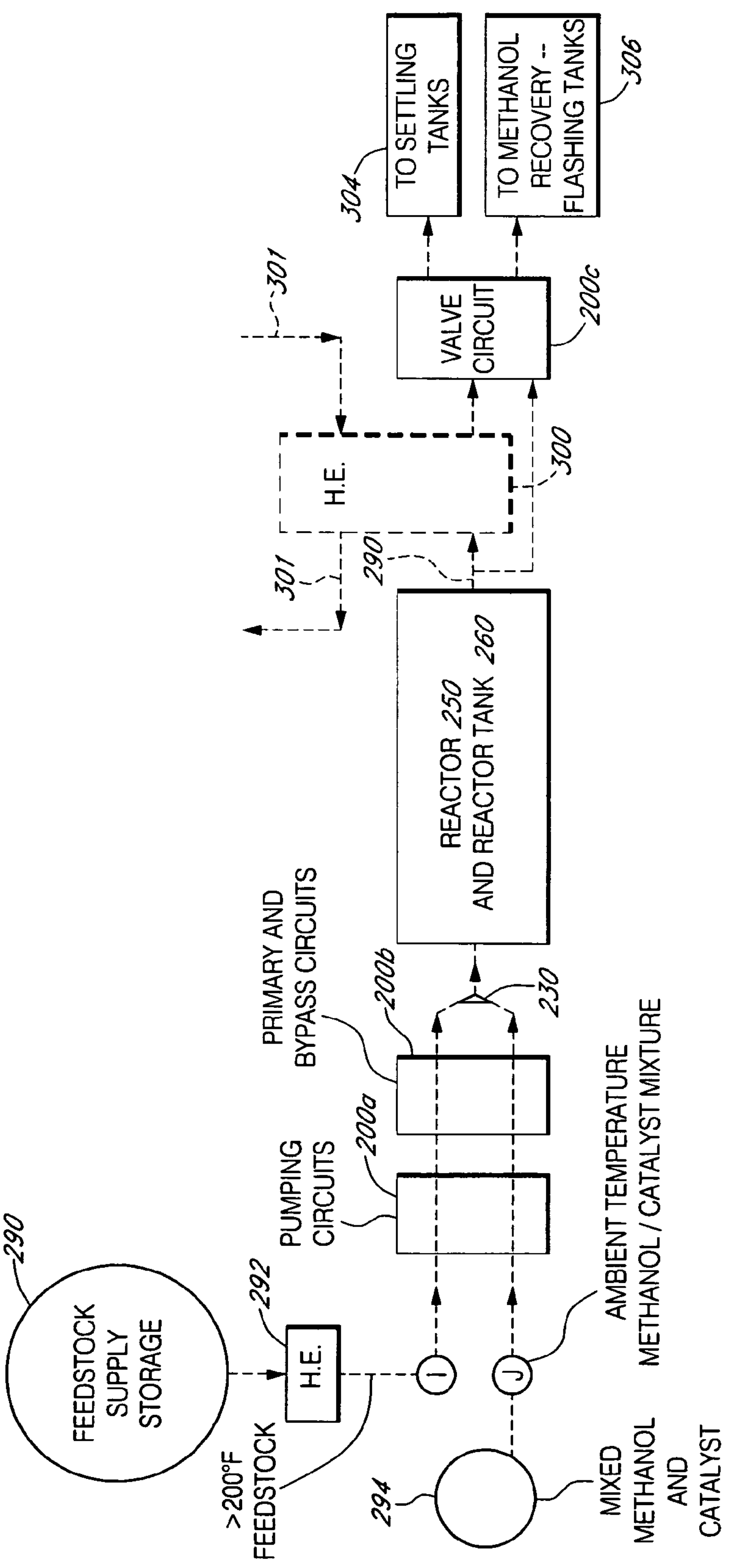
FIG. 23 is a schematic view of a biodiesel plant including the reactor of FIG. 14 and the mixing portion of FIG. 13.

With reference to FIG. 23, there is shown an overall system or plant combining aspects of the plant shown in FIGS. 12-22. Feed stock from supply storage 290, such as tallow and soy been oil passes through a heat exchanger 292 (H.E.). The feed stock is preferably heated to about 200° F. to 210° F. Feed stock then enters pumping circuit 200*a* and passes through the primary (and bypass) circuit 200*b*, then the mixing T-connector 230. Methanol and catalyst are mixed at source 294 at ambient temperature, then sent through the pumping circuit 200*a* and primary (and bypass) circuit 200*b*, then the mixing T-connector 230.

The mixture of feed stock and methanol with catalyst enters reactor 250 at Inlet #1 (outlet 258) to reactor tank 260. Reacted crude biodiesel exits tank 260 at Outlet #2 (outlet 281), e.g., at about or above 200° F., then enters an optional heat exchanger 300.

In accordance with one option of the preferred embodiments, the heat exchanger 300 is used to cool the reacted crude biodiesel and glycerin therein received from the reactor module (reactor 250 and reactor tank 260), preferably to below 140° F. The cooled reactants are then passed through valve circuit 200*c* (of FIG. 13).

Cooling liquid passes through a line 301 into and out of the heat exchanger 300. The extracted heat from this heat exchanger 300 may be used to heat or help heat the feed stock. Where the heat exchanger is used, the cooled reactants pass through valve circuit 200*c* then to settling tanks 304, preferably at ambient pressure and at a temperature at or below 140° F. Settling tanks 304 may be like settler tank 62 or FIG. 9 above followed by processing as shown, e.g., in the first embodiment.

Alternatively, there is no heat exchanger 300 or it is bypassed, and the hot reactants go to a flashing tank 306 to recover excess methanol, typically recovering over 95% of excess methanol. An example of such methanol recovery would occur at step 141 of FIG. 11 above.

Figure 10A:
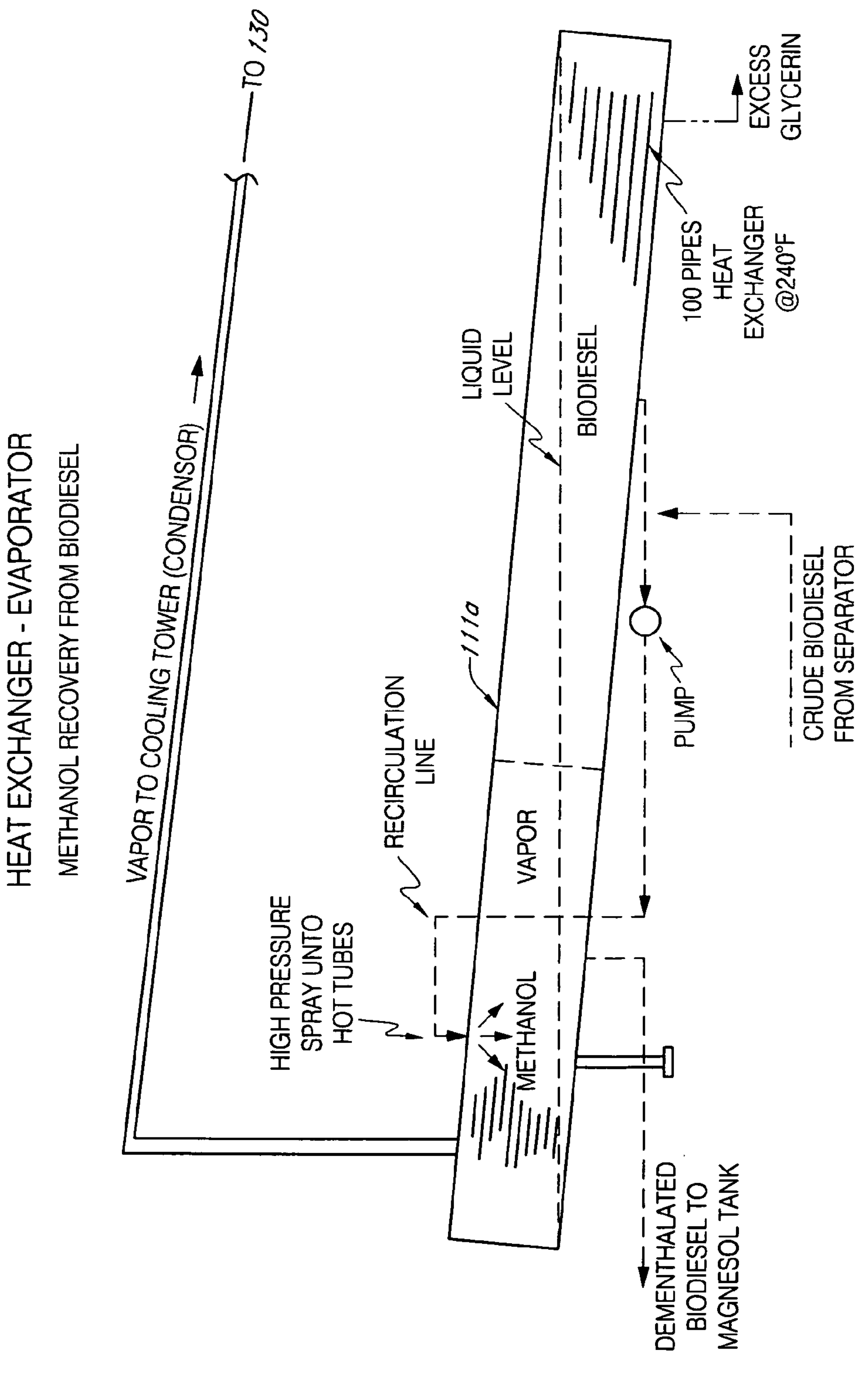
FIG. 10A is a schematic view of a more preferred version of a separator of FIG. 10.

The methanol recovery may also be by using a tank 111*a* such as shown in FIG. 10A, or tank 111 of FIG. 10. Tank 111*a* is a variation of tank 111.

The loop reactor 250 and tank 260 of FIGS. 14-22 may also be used in the system of FIG. 11, in place of reactor 38 and retention vessel 52. In addition, an optional second loop reactor, identical to the first reactor, may be used, in place of the optional second reactor 38*a*.

In the system, methanol requirements (including excess methanol) for biodiesel production usually range from 15% to 20% (by weight) of feed stock usually depending on type of catalyst used, i.e., sodium methylate, potassium hydroxide, etc. Catalyst requirements range from 0.5% to 1.0% (by weight) of feed stock and also depend on the catalyst used.

If the plant is going to be shutdown for more than twenty-four hours, the reactor should be drained because the chemical reaction may continue and form side reactions. Drain the reactor after temperature drops below 140° F. to avoid methanol vapor.

Extended time periods in a reactor (hours versus minutes) may not affect quality of the biodiesel. The quality depends on several factors including feed stock and catalyst used to make biodiesel The reactor of the preferred embodiment holds approximately 240 gallons of liquid so that this small amount when blended with the next plant start-up production may not have any real effect on the quality of the final daily production.

The reactor is designed to run continuously and will perform flawlessly under operating design parameters. It is also very forgiving in a fairly wide range of parameter variances. However, plant start-ups and shut downs can cause small anomalies in product quality.

Since the plant is designed to change operating parameters easily, the plant may be used to "zero in" on the least expensive and most productive ways to operate the plant, i.e., to find the optional percentage of methanol and catalyst, the optimum temperatures, and pressures and other reactors to achieve the highest quality biodiesel. Multiple samples taken even during a one day period will furnish useful information. It is also a good idea to compare samples taken from the loop portion of the reactor and compare them from samples taken from the reactor tank outlet.

When changing parameters the plant should run for at least one hour before taking samples so that the plant can reach steady state conditions.

On shut down of the plant, first shut off the methanol/catalyst pump first, then the feed stock pump. Let the reactor pump run for approximately two minutes then shut it down.

The system should maintain pressure overnight.

Depending on several factors, it is possible that air can enter this closed system through the liquid that enters the system. This air will get caught in the top of the reactor loop or tank, where vent pressure release valves and hand operated ball valves have been placed. Since the pressure during operation is above 40 psi the vent relief valve will open when the hand vent valve is "slightly" cracked open. This should be done with great care to bleed air under pressure, and immediately shut when liquid starts flowing through the valve. Operators should wear proper protective gear (face masks, gloves, apron, etc.) and only crack open the valve. It is practical to connect a long ¾-inch tube from vent to ground level where it would be placed into a steel buck to catch any drops of liquid. The valve should be shut when drops of liquid begin to fall. A slight amount of methanol vapor could escape from the liquid phase. If the reactor pump surges, that means that air is in the system or the operating pressure is too low.

Upon initial start-up all pressure release valves may have to be adjusted slightly including bypass pressure relief valves. This will only take a short time. Under normal operation none of the bypass circuits should be in operation.

The flow to the entire system is controlled by the feed stock pump and methanol/catalyst pump. When these two pumps are shut down, all flow through the system stops. The reactor pump does not control flow through the system.

When the feed stock pump and methanol/catalyst pump are in operation; the reactor pump should always be in operation (except on start-up as previously explained while filling the reactor with fluid). Otherwise, chemical conversion to biodiesel will not fully take place.

It may also be helpful to install a ball valve upstream of Inlet #1 for maintenance purposes, e.g., a stainless steel ball valve. Pressure relief valve (PRV #5) is preferably variable from 40 psi to 125 psi. Pressure relief valve PRV #6 is preferably variable from 40 psi to 140 psi. Both PRV #5 and PRV #6 are preferably set at 40 psi.

The motor is preferably a three phase electrical motor, either 240 V or 480 V.

For plant start up, the following is suggested:

Pressurize reactor system with compressed air to 40 psi. This is necessary to keep methanol in liquid phase at temperatures above boiling point of methanol (above 149° F. at ambient pressure). Check for leaks. Air is purged from the system at system start-up through Vent #1 and Vent #2 as follows:

Start temperature (after mixing tee 230) of feed mixture at 175° F., later increase to 185° F. as feed stock feed rate is increased.

Open the hand valve at Vent #1. Set the pressure relief valve at Vent #1 to 40 psi.

Start system (start feed stock pump and methanol pump) and fill the loop reactor 250 with liquid. Pressure in system will be at 40 psi, which will keep methanol in liquid form and only air will vent from Vent #1. When liquid starts to seep out of the Vent #1, close the valve by hand on Vent #1.

Then start the reactor's pump. Immediately open the valve on Vent #2 (on reactor tank), set PRV #6 to 40 psi. Fill tank with liquid and close valve on Vent #2 when liquid seeps out.

The reactor system is now full of liquid and flow will proceed downstream. Be sure that PRV #3 opens at 60 psi.

Liquid must be cooled to below 145° F. (preferably below 130° F.) before leaving PRV #3, to prevent methanol from flashing in vapor.

Once the system is running, flow rates can be increased along with temperature of system (to 185° F. or 190° F.). Samples should be taken and analyzed to determine completion of reaction. First increase temperature to 185° F. and then take a sample at a flow rate of 10 gpm (gallons per minute); 190° F. at 12 gpm; then 190° F. at 15 gpm. At optimum conditions, 0.000% mass triglycerides are possible.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A method of making biodiesel fuel in a biodiesel plant for making the biodiesel fuel, the plant comprising:

(i) a closed loop reaction chamber having an inlet and an outlet, wherein the closed loop reaction chamber comprises a closed loop flow path, the inlet and outlet being disposed along the closed loop flow path;

(ii) means for circulating reactants through the reaction chamber such that portions of the reactants will pass along the loop from the inlet, past the outlet and back past the inlet for mixing with the other portions of the reactants entering at the inlet;

(iii) means for causing turbulent flow of the reactants through the reaction chamber, wherein the method comprises the steps of:

a) heating the reactants;

b) mixing the heated reactants in the reaction chamber by causing turbulent flow thereof through the reaction chamber causing the reactants to react and form reacted reactants;

c) further circulating the reactants and the reacted reactants in the reaction chamber along the closed loop from the inlet, past the outlet and back past the inlet for mixing with other portions of the reactants entering at the inlet such that at least some reactants and reacted reactants will flow around the reaction chamber multiple times and mix with reactants entering at the inlet; and d) removing the reacted reactants from the outlet, the reacted reactants comprising crude biodiesel fuel, and allowing the crude biodiesel fuel to settle.

2. The method of claim 1, wherein the means for circulating comprises a pump, and the circulating is performed by the pump.

3. The method of claim 1, wherein the means for causing turbulent flow comprises mesh, and the reactants and reacted reactants are flowed through the mesh in the reaction chamber.

4. The method of claim 2, wherein the means for causing turbulent flow includes another pump, and the turbulent flow is caused by pumping against the flow.

5. The method of claim 1, wherein the reactants comprise a first type and a second type of feed stock and the plant further comprises a means for mixing the reactants which comprises a first conduit and a first pump for pumping the first type of feed stock along the first conduit, a second conduit and a second pump for pumping the second type of feed stock along the second conduit, and a T-connector for joining the first and second conduits to mix the first type of feed stock and second type of feed stock prior to entry into the reaction chamber.

6. A biodiesel plant, comprising:

(i) a mixing section for mixing reactants;

(ii) a loop-shaped reaction chamber;

(iii) means for circulating the mixed reactants through the reaction chamber causing the reactants to react; and (iv) a tank for receiving the mixed and reacted reactants, wherein the mixing section comprises a first conduit and a first pump for pumping a first type of feed stock along the first conduit, and a second conduit and a second pump for pumping a second type of feed stock along the second conduit, and a T-connector for joining the first and second conduits to mix the first type of feed stock and second type of feed stock prior to entry into the reaction chamber wherein the first conduit contains a bypass loop.

7. The biodiesel plant of claim 6, wherein the second conduit contains a bypass loop.

8. A biodiesel plant for making biodiesel from reactants including a raw material having fatty acid esters and methanol, the plant comprising:

(i) a supply of a raw material having fatty acid esters;

(ii) a supply of methanol;

(iii) a mixing section for mixing the raw material and the methanol to form mixed reactants;

(iv) a closed loop reaction chamber, wherein the closed loop reaction chamber has an inlet and outlet and comprises a closed loop flow path, the inlet and outlet being disposed along the closed loop flow path;

(v) means for advancing the mixed reactants from the mixing section and into the closed loop reaction chamber through the inlet;

(vi) means for circulating the mixed reactants through the reaction chamber causing the reactants to react and form reacted reactants such that portions of the reactants and portions of the reacted reactants will pass along the closed loop from the inlet, past the outlet and back past the inlet for mixing with other portions of the reactants entering at the inlet such that at least some reactants and reacted reactants will flow around the reaction chamber multiple times;

(vii) a tank for receiving the reacted reactants downstream of the outlet of the reaction chamber including crude biodiesel fuel having biodiesel fuel and glycerin; and (viii) a separator for receiving an output from the tank and separating glycerin from biodiesel fuel, wherein the means for advancing comprises a first pump and moves the reactants through the plant including into the reaction chamber and moves the reacted reactants through the plant including out of the reaction chamber, and wherein the means for circulating comprises a second pump for circulating the reactants and reacted reactants in the reaction chamber at a rate higher than a flow rate of the first pump.

9. The biodiesel plant of claim 8, wherein the reaction chamber further comprises means for causing turbulent flow of the mixed reactants therein.

10. The biodiesel plant of claim 8, wherein there are means for causing turbulent flow in the reaction chamber wherein the means for causing turbulent flow comprises an additional pump.

11. The biodiesel plant of claim 8, wherein the raw material comprises two types of feed stock and the methanol is a catalyst, and the mixing section comprises a first conduit and a second conduit and the first pump is adapted for pumping the first and second types of feed stock along the first and second conduits, and comprising a connector for joining the first and second conduits to mix the first and second types of feed stock prior to entry into the reaction chamber.

12. The biodiesel plant of claim 11, wherein the first conduit contains a bypass loop.

13. The biodiesel plant of claim 12, wherein the second conduit contains a bypass loop.

14. The biodiesel plant of claim 8, further comprising means for adjusting a speed of reaction of the mixed reactants in the reaction chamber which means for adjusting comprises at least one of means for heating the feed stock, and forming at least one of the first pump and the second pump as a variable speed pump.

15. The biodiesel plant of claim 8, wherein the plant comprises means for operating at pressures up to 200 to 300 psi and means for operating at temperatures of up to 300° F.

16. The biodiesel plant of claim 8, comprising a four contingency safety system having bypass circuits and flow indicator relay alarms.

17. The biodiesel plant of claim 16, wherein at least one of the bypass circuits effectively stops flow to the reaction chamber.

18. The biodiesel plant of claim 8, wherein the mixing section, loop-shaped reaction chamber, tank and separator are in a closed system.

* * * * *